(12) United States Patent
Munteanu et al.

(10) Patent No.: US 10,497,089 B2
(45) Date of Patent: *Dec. 3, 2019

(54) CONVOLUTIONAL NEURAL NETWORK

(71) Applicant: FotoNation Limited, Galway (IE)

(72) Inventors: Mihai Constantine Munteanu, Brasov (RO); Alexandru Caliman, Brasov (RO); Corneliu Zaharia, Brasov (RO); Dragos Dinu, Brasov (RO)

(73) Assignee: FotoNation Limited, Galway (IE)

( * ) Notice: Subject to any disclaimer, the term of this patent is extended or adjusted under 35 U.S.C. 154(b) by 67 days.

This patent is subject to a terminal disclaimer.

(21) Appl. No.: 15/234,851

(22) Filed: Aug. 11, 2016

(65) Prior Publication Data
US 2017/0221176 A1 Aug. 3, 2017

Related U.S. Application Data

(63) Continuation-in-part of application No. 15/010,418, filed on Jan. 29, 2016, now Pat. No. 9,665,799.

(51) Int. Cl.
*G06T 1/00* (2006.01)
*G06N 3/08* (2006.01)
(Continued)

(52) U.S. Cl.
CPC ............ *G06T 1/60* (2013.01); *G06K 9/00986* (2013.01); *G06K 9/4628* (2013.01);
(Continued)

(58) Field of Classification Search
CPC .................................. G06T 1/60; G06N 3/08
See application file for complete search history.

(56) References Cited

U.S. PATENT DOCUMENTS 9,665,799 B1* 5/2017 Munteanu ............ G06K 9/6245
2010/0138587 A1* 6/2010 Hutson ............... G06F 12/0607
711/5
(Continued)

FOREIGN PATENT DOCUMENTS

WO 2014005783 A1 1/2014
WO 2016083002 A1 6/2016

OTHER PUBLICATIONS

Kang et al., An Energy-Efficient Memory-Based High-Throughput VLSI Architecture for Convolutional Networks, 2015, IEEE, 978-1-4673-6997-8/15, p. 1037-1041.*
(Continued)

*Primary Examiner* — Samantha (Yuehan) Wang

(57) ABSTRACT

A convolutional neural network (CNN) for an image processing system comprises an image cache responsive to a request to read a block of N×M pixels extending from a specified location within an input map to provide a block of N×M pixels at an output port. A convolution engine reads blocks of pixels from the output port, combines blocks of pixels with a corresponding set of weights to provide a product, and subjects the product to an activation function to provide an output pixel value. The image cache comprises a plurality of interleaved memories capable of simultaneously providing the N×M pixels at the output port in a single clock cycle. A controller provides a set of weights to the convolution engine before processing an input map, causes the convolution engine to scan across the input map by incrementing a specified location for successive blocks of pixels and generates an output map within the image cache by writing output pixel values to successive locations within the image cache.

2 Claims, 6 Drawing Sheets

(51) Int. Cl.
*G06T 1/60* (2006.01)
*G06K 9/62* (2006.01)
*G06K 9/00* (2006.01)
*G06K 9/46* (2006.01)
*G06N 3/04* (2006.01)

(52) U.S. Cl.
CPC ......... *G06K 9/6272* (2013.01); *G06N 3/0454* (2013.01); *G06N 3/08* (2013.01)

(56) References Cited

U.S. PATENT DOCUMENTS

| | | | |
|---|---|---|---|
| 2012/0092356 A1* | 4/2012 | Jiao | G06F 12/0223 345/541 |
| 2013/0007078 A1* | 1/2013 | Wegener | G06F 7/483 708/203 |
| 2015/0262344 A1 | 9/2015 | Stec et al. | |

OTHER PUBLICATIONS

Vlad Georgescu and Mihai Constantin Munteanu: "Image Processing Apparatus", Provisional U.S. Appl. No. 62/210,243, filed Aug. 26, 2015.

* cited by examiner

CONVOLUTIONAL NEURAL NETWORK

RELATED APPLICATIONS

This application is a continuation-in-part of U.S. application Ser. No. 15/010,418 filed 29 Jan. 2016.

FIELD

The present invention relates to a convolutional neural network with an improved image cache.

BACKGROUND

A processing flow for typical Convolutional Neural Network (CNN) is presented in FIG. 1. Typically, the input to the CNN is at least one 2D image/map 10 corresponding to a region of interest (ROI) from an image. The image/map(s) can comprise image intensity values only, for example, the Y plane from a YCC image; or the image/map(s) can comprise any combination of colour planes from an image; or alternatively or in addition, the image/map(s) can contain values derived from the image such as a Histogram of Gradients (HOG) map as described in PCT Application No. PCT/EP2015/073058, the disclosure of which is incorporated by reference, or an Integral Image map.

CNN processing comprises two stages:
Feature Extraction (12)—the convolutional part; and
Feature classification (14).

CNN feature extraction 12 typically comprises a number of processing layers 1 . . . N, where:
Each layer comprises a convolution followed by optional subsampling;
Each layer produces one or (typically) more maps;
The size of the maps after each convolution layer is typically reduced by subsampling;
A first convolution layer typically performs 2D convolution of an original 2D image/map to produce its output maps, while subsequent convolution layers perform 3D convolution using the output maps produced by the previous layer as inputs. Nonetheless, if the input comprises say a number of maps previously derived from an image; or multiple color planes of an image; or multiple versions of an image, then the first convolution layer can operate in exactly the same way as successive layers, performing a 3D convolution on the input images/maps.

FIG. 2 shows an example 3D convolution with a 3×3×3 kernel performed by a subsequent feature extraction convolution layer of FIG. 1. The 3×3×3 means that three input maps A, B, C are used and so, a 3×3 block of pixels from each input map is needed in order to calculate one pixel within an output map.

A convolution kernel also has 3×3×3=27 values or weights pre-calculated during a training phase of the CNN. The cube 16 of input map pixel values is combined with the convolution kernel values 18 using a dot product function 20. After the dot product is calculated, an activation function 22 is applied to provide the output pixel value. The activation function 22 can comprise a simple division, as normally done for convolution, or a more complex function such as sigmoid function or a rectified linear unit (ReLU) activation function of the form: $z_j = h(a_j) = \max(0, a_j)$ as typically used in neural networks.

In this case, for 2D convolution, where a single input image/map is being used, the input image/map would be scanned with a 3×3 kernel to produce the pixels of a corresponding output map.

Referring back to FIG. 1, the layers involved in CNN feature classification 14 are typically as follows:
The maps produced by the last convolutional layer are concatenated in a single vector (Vinput);
Vinput is the input to a multi-layer fully connected network comprising a sequence of fully connected network layers, each processing a vector input and providing a vector output;
The output of the fully connected network comprises a vector of classification scores or a feature vector representative of the input image/map(s) in accordance with the CNN training.

The CNN is trained to classify the input ROI into one or more classes. For example, for a ROI potentially containing a face, a CNN might be used to determine if the face belongs to an adult or a child; if the face is smiling, blinking or frowning. For ROI potentially containing a body, the CNN might be used to determine a pose for the body.

Once the structure of the CNN is determined, i.e. the input maps, the number of convolution layers; the number of output maps; the size of the convolution kernels; the degree of sub-sampling; the number of fully connected layers; and the extent of their vectors—the weights to be used within the convolution layer kernels and the fully connected layers used for feature classification are determined by training against a sample data set containing positive and negative labelled instances of a given class, for example, faces labelled as smiling and regions of interest containing non-smiling faces. Suitable platforms for facilitating the training of a CNN are available from: PyLearn which is based on Theanoand MatConvNet which is in turn based on Caffe; Thorch; or TensorFlow. It will nonetheless be appreciated that the structure chosen for training may need to be iteratively adjusted to optimize the classification provided by the CNN.

In any case, it would be useful to incorporate a CNN engine within an image processing system so that feature classification might be performed on the fly as images are acquired or at least soon afterwards. For example, a CNN might be incorporated within an image acquisition system such as described in U.S. Provisional Application No. 62/210,243 filed 26 Aug. 2015, PCT Application WO2014/005783 and US2015/262344, the disclosures of which are incorporated by reference.

However, in order to do so, the responsiveness and memory requirements for the CNN need to be rationalized.

SUMMARY

According to a first aspect, there is provided a convolutional neural network engine for an image processing system according to claim 1.

Embodiments of this aspect of the invention provide a CNN engine readily incorporated within an image processing system and where the CNN engine can be programmably configured to operate with varying feature extracting convolutional layers as well as feature classification layers. The CNN engine includes an image cache with a pipelined architecture able to rapidly provide input map information to a convolution engine so that a 3D convolution involving a given number of input maps can be performed in a minimum number of clock cycles.

In a second aspect, there is provide an image processing system according to claim 21.

Embodiments of this aspect provide a configurable system where blocks of pixels of varying sizes can be simultaneously read from an image cache for processing to produce output data.

BRIEF DESCRIPTION OF THE DRAWINGS

Embodiments of the invention will now be described, by way of example, with reference to the accompanying drawings, in which.

DETAILED DESCRIPTION

Figure 1:
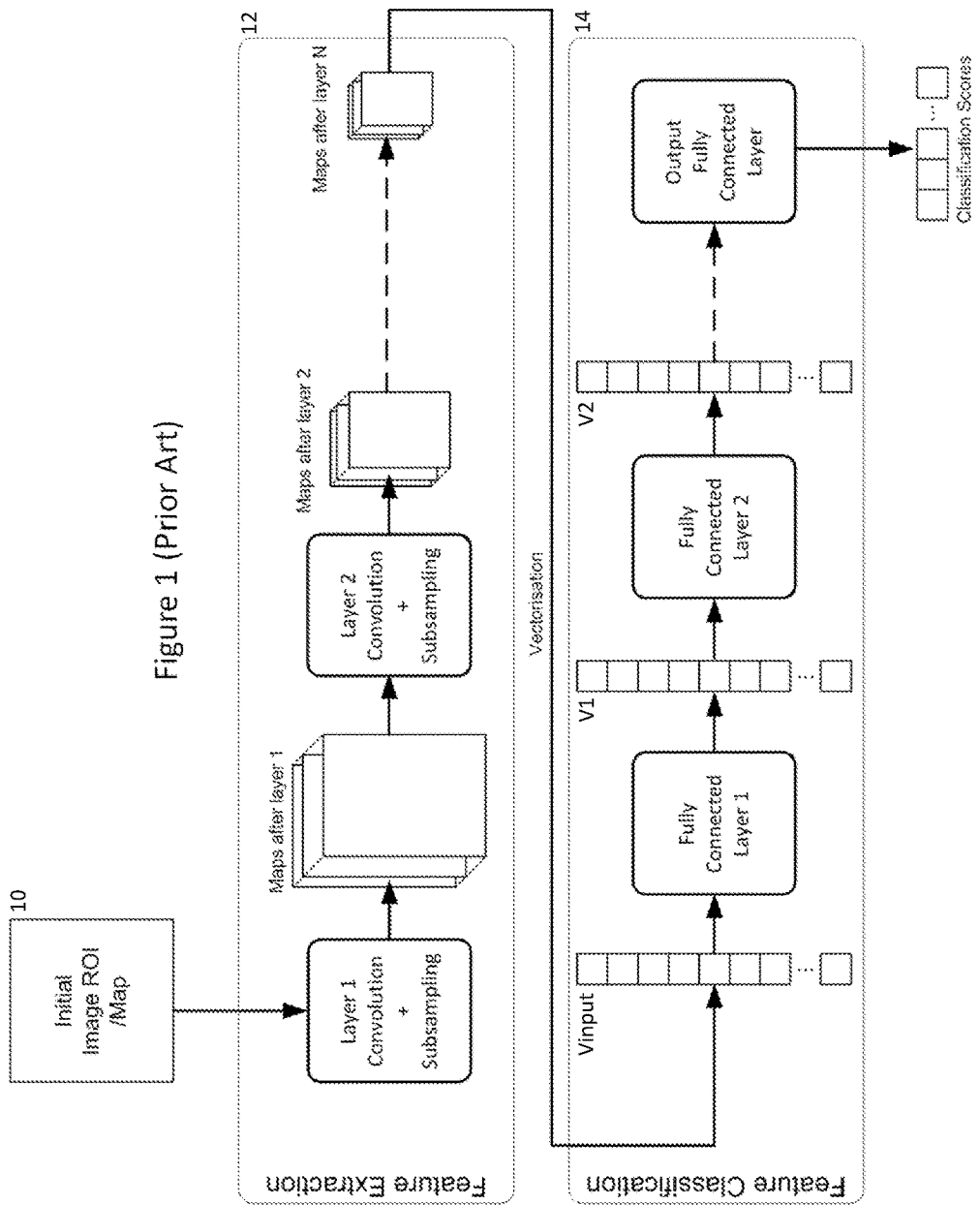
FIG. 1 shows a typical Convolutional Neural Network (CNN)
Figure 2:
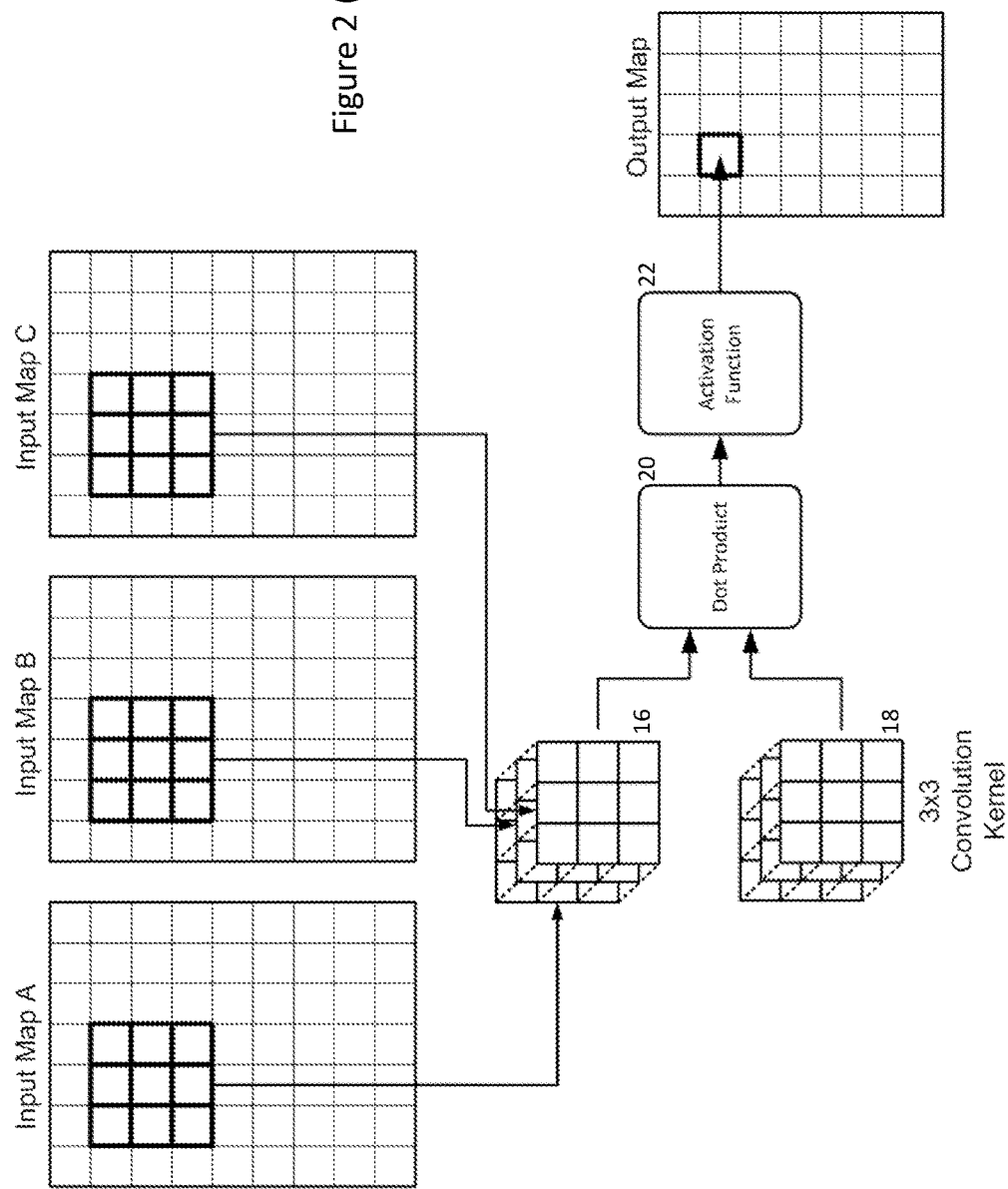
FIG. 2 shows an exemplary 3D Convolution with a 3×3×3 kernel.
Figure 3:
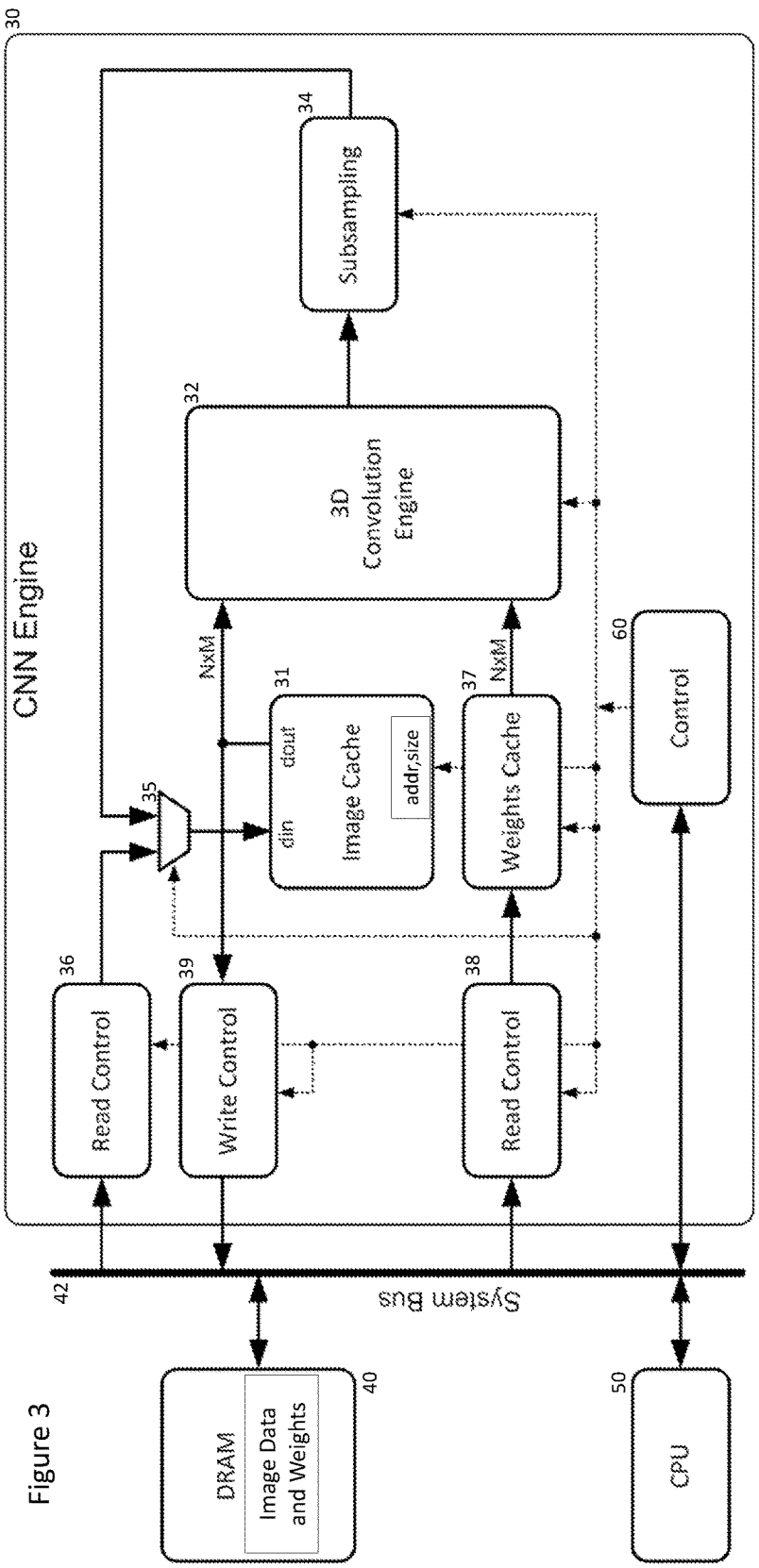
FIG. 3 is a block diagram of a CNN according to an embodiment of the present invention.

FIG. 3 shows a block diagram of a CNN Engine 30 implemented according to an embodiment of the present invention within an image acquisition system. The CNN Engine 30 connects to a system bus 42 and can access main (DRAM) memory 40 into which images acquired by the system are written. Image acquisition pipelines which obtain and possibly pre-process images before or after they are written to DRAM 40 are well known and are not described in detail here, but examples of such systems are described in U.S. Provisional Application No. 62/210,243 filed 26 Aug. 2015, PCT Application WO2014/005783 and US2015/262344 referred to above.

An application (not shown) being executed by a system CPU 50 can therefore signal to a controller 60 within the CNN Engine 30 across the system bus 42 that a region of interest (ROI) of an image stored in DRAM 40 and indicated by the CPU 50 is to be analyzed and classified. The controller 60 can be implemented as a fixed state machine, or it can be programmable (a CPU). In either case, the configurable succession of feature extraction and classification operations to be performed by the CNN Engine 30 is determined by the CPU 50 by setting registers within the controller 60 via the system bus 42.

Once configured, the controller 60 then communicates with various modules within the CNN Engine 30 to read the required image or image map information and CNN weight information from DRAM 40 and to process this information before providing a classification for the image information to the DRAM and/or the calling application for use subsequently.

The CNN Engine 30 comprises the following modules:

An image cache 31 exposes a data input port (din) and a data output port (dout) to the remainder of the CNN engine 30. Data is read through the data input port (din) either from DRAM 40 via read controller 36 or from the output of a convolution engine 32 via a sub-sampler 34 to an address specified at an address port of the image cache by the controller 60. Switch 35 is provided to enable image/map data to be initially provided via the read controller 36 from DRAM 40, but subsequently, for information generated by the various layers of the convolution engine 32/sub-sampler 34 to be read back into the image cache 31 as described below.

Figure 4:
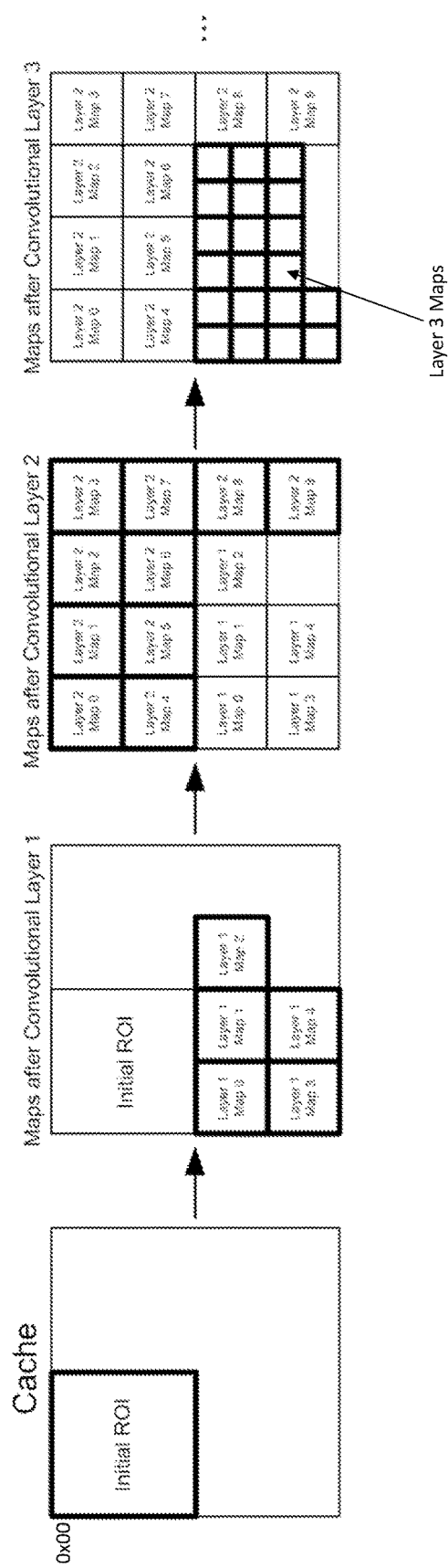
FIG. 4 illustrates an exemplary memory organization of images and maps within the image cache of FIG. 3.

Referring now to FIG. 4, an initial ROI image/map is first loaded in the image cache 31 and typically extends from address 0x00, offset 0 of the image cache. Note that the cache is addressed in a 2D fashion with an address comprising an address row and an offset at the address. After the first convolution and subsampling layer of feature extraction, a number of maps, in this case 5, Layer 1 Map 0 . . . Layer 1 Map 4, are generated. In this case, these are written to address lines of the image cache 31 following the last address location of the initial ROI image/map. As these maps are typically sub-sampled relative to the initial ROI image/map at a scale of 2, two of these maps can be written within the same address range as the initial ROI image/map. Also note that as the width of these maps is a fraction of that of the ROI image/map, multiple layer 1 maps can be written to the same address space, shifted at offsets of one map width relative to one another. As will be seen, as processing progresses, for each new layer, the number of maps can be larger, but the size of the maps typically decreases due to subsampling. In, this example, convolution layer 2 generates 10 maps from the 5 maps produced by convolution layer 1, but without subsampling. The new maps produced by convolution layer 2 can overwrite the area of the image cache that was used by the initial ROI image/map as this is no longer required for processing subsequent layers. Note that again Layer 2 Maps 1 . . . 3 are successively shifted within the cache relative to one another and Map 0; as are Maps 5 . . . 7 relative to Map 4. Also, note that Layer 2 Maps 8 and 9 are written within the address space of the Layer 1 maps, but shifted relative to these maps. Nonetheless, if the image cache were large enough, the initial ROI image/map could be preserved to be used for other processing, for example, if a new classification were required or if the cache were shared with other processing engines. In the example of FIG. 4, convolution Layer 3 produces 20 subsampled maps from the 10 maps of layer 2. Again, these can overwrite the maps of layer 1 as these are no longer required.

Note that for the purposes of image cache access, vectors produced by the feature classification layers are treated as if they were 1D maps containing 1×W cells of pixel values.

In each case, a start location, comprising the base address and extent of shifting, the offset, of an image/map, map or vector within the image cache 31 is determined by the controller 60 according to the configuration received from the CPU 50.

For the purposes of the following description, we will describe relative addresses within each map and how these are determined, assuming that the start location is added to these relative addresses.

In any case, it will be seen that the image cache 31 is initially loaded with an input image/map from DRAM 40. Then all processing can be performed only using this image cache 31 with no need to access the external DRAM for image information until classification is complete. After each convolution/subsampling stage, the intermediate image maps/vectors are written back to a different image cache area determined by the controller 60. Those maps/vectors can then be read for processing by the next processing layer, before writing further intermediate or final maps/vectors back into a different image cache area. Maps/vectors written back into the image cache 31 can overwrite maps/vectors from more than 1 previous iteration e.g. layer 2 output maps can overwrite the original input image/map, as this is not required for subsequent layers.

In the implementation of FIG. 3, data can be read from the output port dout or written to the input port din of the image cache 31 in N×M windows of pixels ranging from 1×1 (a single pixel) to 5×5 and, depending on alignment, up to 8×8 pixels extending from a (relative) base address for a window. Thus, for 8 bit pixel values the data ports are 512 (8×8×8) pixels wide. Nonetheless, it will be appreciated that the invention could equally be implemented with pixels of different resolutions than 8 bits.

Note that once feature extraction/classification is complete, any of the generated maps/vectors can be written back to DRAM 40 via a write controller 39. Nonetheless, the controller 39 or controller 60 may only be required to provide the final classification values and so the write controller 39 is not essential or at least the write controller 39 may only be required to provide final classification values.

A weights cache 37, similar to the image cache 31, stores the weights used in both feature extraction and feature classification. As explained above, for feature extraction, the weights are convolution kernel values; whereas for feature classification, the weights are fully connected layer neuron/connection weight values. Read controller 38 for the weights cache brings weight values from DRAM 40 before processing each layer. For example, in a feature extraction convolution layer, if there are 5 input maps and the kernel size is 5×5, 5×5×5 (75) weights have to be brought from DRAM before the generation of each output map. In feature classification, more weights could be needed than the maximum space available into the weights cache 37. If so, then processing is done using a first of set of weights filling the weights cache 37, then the next weights are brought from DRAM 40 before processing continues with the new weights. For example, if a vector to be classified has 2048 elements and an output vector has 15 elements, 15×2048 weights are needed for the fully connected layer i.e. there are 2048 weights needed for every element of the output vector. If the weights cache has size 1024, the read controller 38 for the weights cache 37 brings the first 1024 weights needed for computation of the first element of the output vector, the computation is done using these weights, then the read controller 38 brings the next 1024 weights needed for computation of the element, then the computation continues, then it brings the first 1024 weights needed for computation of the second element of the output vector and so on.

It will be appreciated that if implementations employed a typical 8-bit floating point (FP) representation for the weight values, using for example, 1 bit for sign, 4 bits for exponent and 3 bits for mantissa, some weight values could tend to be zeroed or saturated.

Thus in some implementations, rather than increasing the storage requirement, the memory bandwidth and the computational requirements by using 16 bits or more for weight representation, a default FP exponent bias is changed to a custom value. In a standard FP representation, the default exponent bias is computed as $2^{exP-1}-1$ where exp is the number of bits used for exponent representation (4 in this case); this bias is subtracted from the binary representation of the exponent, leading to the actual exponent; so for 4 bits for exponent, the range of values for the exponent value is from 0 to 15D; subtracting the bias (7D in this case) leads to actual exponent values from −7D to 8D; an exponent equal with −7D means a subnormal weight; an exponent of 8D is not a number in FP representation; therefore, the actual range of possible exponents is from −6D to 7D (i.e. $2^{-6}:2^7$).

This is a symmetric representation which may be used to create a balance between representing small and large numbered weight values.

However, in some embodiments, in order to provide a better representation for more common smaller numbered weight values, the exponent bias is changed to larger values, thus leading to an asymmetric representation between small and large numbers; for instance, using an exponent bias equal to 12D, the actual exponent values would be from −11D to 2D, resulting in a better precision for representing smaller numbered weight values (i.e. $2^{-11}:2^2$).

By using the proposed weight representation, in typical cases, the network's performance remains the same as in the case of using floating-point representation with a larger number of bits but with a default bias.

Note that in some embodiments, each of the read/write controllers 36, 38 and 39 can read or write more than 1 pixel/weight/cell from/to system memory 40 in one clock cycle. For example, if the system bus 42 comprises 64 bits, 8 pixels/weights/cells could be transferred across the bus 42 in one clock cycle. Thus, an 8×1 pixel window, set of weights or vector could be read/written from or into the caches 31 or 37 in one transaction. In particular, for a 64 bit wide system bus 42 where inside a burst transaction on the system bus, new data is produced every clock cycle, if both the bus 42 and the cache 31 operate at the same clock frequencies, the controller 60 could operate in such a way that input data is aligned properly within the image cache 31 and so 8×1 pixels could be written to the cache 31 in one clock cycle.

The 3D Convolution Engine 32 has two modes of operation:
Feature extraction mode
Feature classification mode.

In the feature extraction mode the weights needed to generate a current output map are read from DRAM 40 by the read controller 38; and the input image/map is initially read by the read controller 36. The input data for each output map pixel and the weights are presented to the convolution engine 32. A window of N×M pixel values for each input map is read from the image cache 31 in a given clock cycle, whereas the weights for an output map need only be provided once per output map. The convolution engine 32 performs a number of scalar (dot) products followed by an activation function to produce a pixel value. If there is a down-sampling after a convolution layer, the sub-sampler 34 performs a max-down-sampling and the resultant data is provided to a sub-sampler data output interface ready to be written back to the image cache 31. (Other sub-sampling schemes such as averaging could also be used.) The most common subsampling scale is 2 in both x and y directions. This means that a block of 2×2 pixels after the convolution engine 32 is combined into one pixel provided to the sub-sampler data output interface. If no sub-sampling is required, the data generated by a convolution engine processing layer can be sent directly to the sub-sampler data output interface. Data can then be written from the sub-sampler data output interface to the image cache 31 via the switch 35 in the same manner as data provided from the read controller 36.

In feature classification mode, weights are read from DRAM 40 with the read controller 38. The input vector to be classified is organized in the image cache 31 similar to a map used in feature extraction, but with a size of 1 line and a width (W) equal to the length of the feature vector. Therefore, vector data can still be read from memory in windows of multiple pixels if required. However, given that more weights per vector cell may be required than can fit in the weights cache 37, reading data for multiple vector cells in a single clock cycle may not be highly advantageous. Nonetheless, for each vector cell, the convolution engine 32 performs a number of scalar products followed by activation functions; and the resultant data is sent to the sub-sampler data memory interface, as before, in order to be written into the image cache 31. This is repeated until the entire output vector is computed and written into the image cache 31. At the end, the final output vector comprising the classification for the ROI is sent out by the write controller 39 to DRAM 40 for further processing.

As indicated above, especially during feature extraction, the convolution engine 32 can process windows of N×M pixels provided by the image cache 31 each clock cycle. In order to produce one output pixel in a given output map, the convolution engine 32 needs: one clock cycle for 2D convolution; or a number of clock cycles equal to the number of input maps for 3D convolutions. The same convolution architecture can be used for feature extracted and classification. For feature classification, each neuron/connection of the fully connected layers will have a different weight so the number of weights will typically be greater than for convolutional feature extraction where the same convolutional kernel is applied when calculating each pixel of a new map. Once the image data and weights are available within the image cache 31 and weights cache 37, the convolution engine 32 performs a number of scalar products to produce an output pixel value. It is appreciated that using a more parallelized cache 31 could accelerate the process by for example calculating pixels for output maps in parallel, but this would excessively increase the size of the convolution engine 32.

As will be described in more detail below, as well as reducing the bandwidth requirement for accessing the system DRAM 40 by reading an image portion from DRAM only once during image classification; the image cache 31 is arranged to accelerate processing by producing rectangular windows of N×M pixels for use within the convolution engine 32 in as few clock cycles as possible and preferably in a single clock cycle.

A typical size for the convolution kernels for embedded applications is 5×5, but it will be appreciated that this may vary. Embodiments of the present invention can operate with kernels of any size up to 5×5 operating on windows located at any (x, y) location in the image cache 31 and, depending on alignment within an input/output map, potentially up to 8×8 pixels.

Figure 5:
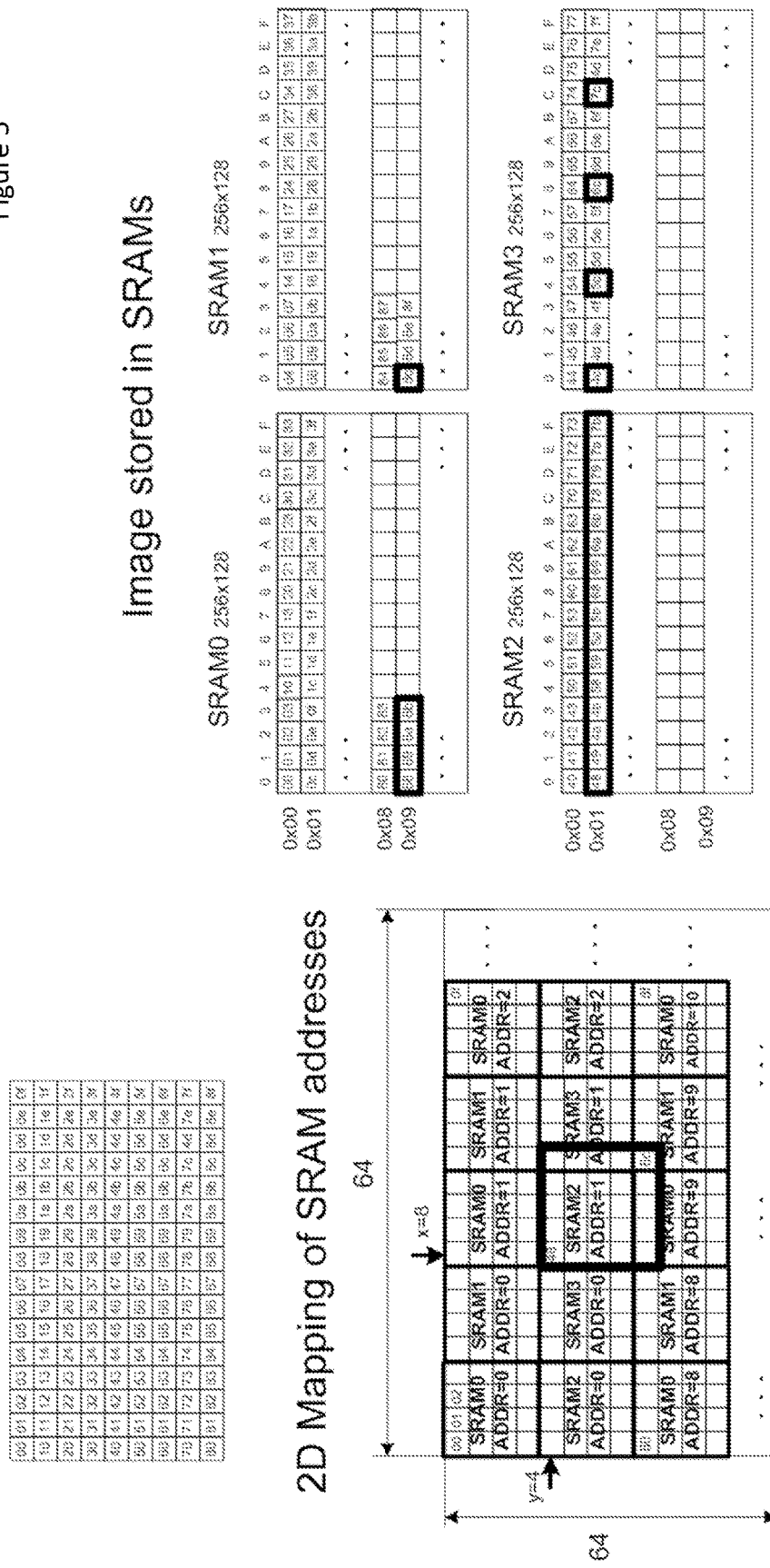
FIG. 5 illustrates an exemplary memory organization for a specific image/map within the image cache of FIG. 3.

Referring to FIG. 5, in embodiments of the present invention, the image cache 31 comprises an interleaved memory architecture allowing reading and writing of blocks of pixels in one clock cycle. In the embodiment, there are 4 SRAM instances—SRAM0 to SRAM3.

In FIG. 5, the left-hand side shows the 2D organization of the image cache for a 64×64 pixel image region. In FIG. 5, pixel indices begin with 00 and image cache addresses at 0x00. These can each be relative addresses both within an image, image ROI or the image cache 31, with the absolute address comprising the relative address plus a start location being determined by the controller 60 as explained above in relation to FIG. 4.

The right hand side of FIG. 5 shows how image data is stored in each SRAM. At each (x, y) SRAM address coordinate, a block of 4×4 pixels is stored. So at address 0x00 of SRAM2, a block of 4×4 pixel values from index 40 to 73 are stored. Similarly, at address 0x01 of SRAM3, a block of 4×4 pixel values from index 4c to 7f are stored. In the example, a 5×5 window at address (8, 4) extending from pixel 48 to 8c is being addressed and the numbers inside each pixel represent the index of that pixel in the input/output window. This arrangement allows reading and writing of blocks of pixels in only one clock cycle as follows:

Block of size 1×1 up to 5×5 pixels can be read from or written to any location. It will be seen that in some cases windows of greater than 5×5 pixels, say from address (7, 3) would require data to be read from more than 2 addresses of SRAM0, SRAM1 and SRAM3. So in order to read/write window information in a single clock cycle, window blocks of 6×6 pixels can only be read from even x and y coordinates; whereas window blocks of 7×7 and 8×8 pixels, can only be read from locations with x and y coordinates that are multiples of 4. Window sizes above 8×8 pixels need more than 1 clock cycle to be read from the image cache 31. Nonetheless, non-rectangular blocks of pixels can also be accessed with independent maximum size limitation for x and y directions.

For embedded applications, 5×5 convolution kernels fit very well with the maximum window size limit of the cache. As indicated, for larger kernel sizes, reading with steps of 2 or 4 pixels can be used; if not, multiple reads would have to be done from the image cache 31. In any case, the use of this image cache 31 simplifies the CNN Engine 30, as large blocks of pixels feeding the convolution engine 32 can be accessed each clock cycle.

Although not essential, it can be more convenient that any new map is written at a new start address within the image cache 31.

Figure 6:
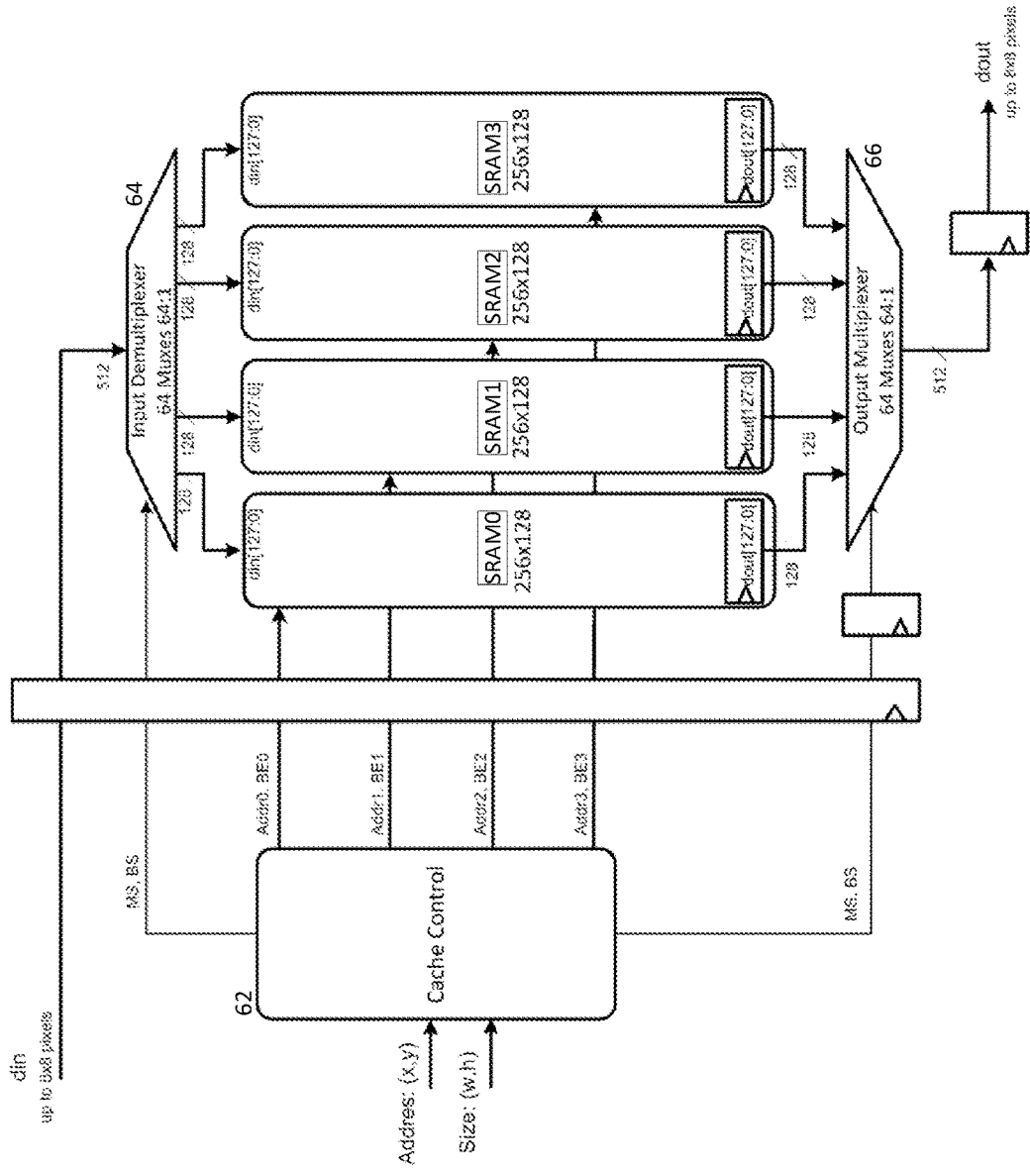
FIG. 6 shows the internal structure of the image cache of FIG. 3.

The internal structure of the cache is presented in FIG. 6. Including the output register (dout), there are three pipeline stages in this implementation. (There can of course be fewer or more registers, increasing or decreasing the pipeline length (and latency) of the cache. Three is just used in this embodiment as it provides a good compromise between area and performance.) As the image cache 31 can provide a new N×M window every clock cycle, if the convolution engine 32 can also process such a window in one clock cycle, data can move through the pipeline one window, one dot product and one output register write per clock cycle. So when performing a read operation, the output data can be available after 3 clock cycles, but after this, successive read operations can be performed each clock cycle. New read and write operations can of course be initiated every clock cycle, and also read and write operations can be mixed in any order.

The implementation of FIG. 6 comprises the following sub-modules:

Cache control block (62):
  Receives the x, y coordinate and window size (w, h) for a read or write operation; and
  Calculates input data de-multiplexer and output data multiplexer selection signals (MS, BS);
  Transforms the x, y, w and h inputs into Address (ADDR) and Byte (Pixel) Enable (BE) control signals for each of the four SRAMs.

Input Data De-multiplexer (64) and Output Data Multiplexer (66):
  The blocks 64, 66 route each input/output pixels data to and from the correct SRAM and to the correct pixel location within each SRAM data in and data out ports. As indicated, the input and output data presented at the din port by the read controller 36 or the sub-sampler data output interface or the dout port by the image cache 31 is organized in a 2D window comprising up to 8×8 pixels of data, with the (x, y)

window address referring to the window origin, which is located in the left-top corner.

Address Calculation

The addresses ADDR0 to ADDR3 for each memory instance SRAM0 to SRAM3 respectively can be calculated by the cache control block 62 using the following formulae (using Verilog like syntax).

ADDR0={(y+4)>>(sqrt(n)-1), (x+4)>>(sqrt(n)-1)}
ADDR1={(y+4)>>(sqrt(n)-1), x>>(sqrt(n)-1)}
ADDR2={y>>(sqrt(n)-1), (x+4)>>(sqrt(n)-1)}
ADDR3={y>>(sqrt(n)-1), x>>(sqrt(n)-1)} where {A, B} means A concatenated with B, where A and B are signals of one or more bits, so if A and B are 4 bit signals, {A, B} will be an 8 bit signal; and where n is width of the image cache memory in 4×4 blocks, so in the current example n=16 to accommodate a 64 pixel wide image.

Thus, y is decimated to provide the most significant bits of the address row; whereas x is decimated to provide the least significant bits of the address row.

Thus, it will be seen that in order to implement the above described addressing scheme, the cache width should be in powers of two.

On the other hand, the number of rows in the image cache 31 should ideally be at least as large as the first input image/map(s) and, usefully, the number of rows should be sufficient to accommodate both the input image/maps and output maps of at least one convolution layer. In the example, of FIGS. 5 and 6, for a 64 row image, 256 rows are ample to store both the input image/maps, output maps from at least one layer and feature extraction vectors.

It will nonetheless the appreciated that in practice, images are likely to be larger than 64×64 pixels, and so n in the example above is likely to be much larger than 16.

It can be noticed that only two adders are needed to calculate the addresses: x+4 and y+4. The shift by 3 operations translates to a simple bit select needing no logic gates in a hardware implementation.

If the image cache memory width were not a power of two, then more complicated logic than outlined above would be required to determine the required image cache address line for each SRAM.

Memory Select

Selection of memories SRAM0 . . . SRAM3 for any pixel of a window to be read or written from/to the image cache 31 is performed by the cache control block 62. Depending on the (x, y) address, each pixel within the din/dout ports corresponds to one of the four memory instances SRAM0 . . . SRAM3. Each of the four memory select signals MS00 . . . MS11 has two bits, encoding the corresponding memory:

00—SRAM0
10—SRAM1
01—SRAM2
11—SRAM3

Two sets of signals: memory select (MS) and byte select (BS) are used by the cache control block 62 to calculate byte enable signals BE0 . . . BE3 for the memories SRAM0 . . . SRAM3.

The formulae for the memory select (MS) signals for the pixels of a window extending up to 8×8 pixels from the (x, y) origin can be described using Verilog style syntax as follows:

MS00={(y [2]==0), (x [2]==0)}
MS01={((y+1)[2]==0), (x [2]==0)}
MS02={((y+2)[2]==0), (x [2]==0)}
MS03={((y+3)[2]==0), (x [2]==0)}
MS04={((y)[2]==1), (x [2]==0)}
MS05={((y+1)[2]==1), (x [2]==0)}
MS06={((y+2)[2]==1), (x [2]==0)}
MS07={((y+3)[2]==1), (x [2]==0)}
MS10={(y [2]==0), ((x+1)[2]==0)}
MS11={((y+1)[2]==0), ((x+1)[2]==0)}
MS12={((y+2)[2]==0), ((x+1)[2]==0)}
MS13={((y+3)[2]==0), ((x+1)[2]==0)}
MS14={((y)[2]==1), ((x+1)[2]==0)}
MS15={((y+1)[2]==1), ((x+1)[2]==0)}
MS16={((y+2)[2]==1), ((x+1)[2]==0)}
MS17={((y+3)[2]==1), ((x+1)[2]==0)}
. . .
MS44={((y)[2]==1), ((x+4)[2]==0)}
. . .
MS70={(y [2]==0), ((x+7)[2]==0)}
MS71={((y+1)[2]==0), ((x+7)[2]==0)}
MS72={((y+2)[2]==0), ((x+7)[2]==0)}
MS73={((y+3)[2]==0), ((x+7)[2]==0)}
MS74={((y)[2]==1), ((x+3)[2]==1)}
MS75={((y+1)[2]==1), ((x+3)[2]==1)}
MS76={((y+2)[2]==1), ((x+3)[2]==1)}
MS77={((y+3)[2]==1), ((x+3)[2]==1)} where A[2] means bit 2 (the $3^{rd}$ least significant bit) of signal A.

So, in the example of FIG. 4, the memory selected for pixel 59 (MS 11 of the window extending from pixel 48 to 8c) is:

y+1=5D=0101h, x+1=9D=1001h,
y+1[2]=1≠0, x+1[2]=0==0, ⇒MS11=01=SRAM2 whereas the memory selected for pixel 5c, MS14 of the window is:
y=4D=0100h, x+1=9D=1001h
y[2]=1==1, x+1[2]=0==0, ⇒MS14=11=SRAM3
and the memory selected for pixel 8c, MS44 of the window is:
y=4D=0100h, x+4=9D=1100h
y[2]=1==1, x+4[2]=1≠0, ⇒MS14=10=SRAM1.

Again, it can be noticed that only the x+1, x+2, x+3 and y+1, y+2, y+3 sums are needed to calculate all the memory select (MS) signals.

MS00 . . . MS77 indicate to the cache control block 62 the SRAM each pixel of their N×M input/output data output interface is to be read from/written to. Now the cache control block 62 needs to assert a byte (pixel) enable signal BE0 . . . BE3 for each of the SRAMs to signal which specific pixels of the 16 pixels stored at any given memory address are to be read from/written to. (Note that in this case, the term byte is used synonymously with 8 bit pixels, however, this would vary in embodiments using different pixel resolution.)

Looking again at the example of FIG. 5, it will be seen that all 16 pixels from address 0x01 of SRAM2 are required, whereas only pixel 0 from address 0x09 of SRAM1 is required when reading or writing the 5×5 window shown. Thus, as well as knowing to or from which memory a pixel is to be written or read, the cache control block 62 also needs to determine to or from which offset within a given memory address is pixel is to be read or written.

One embodiment of the invention begins by first of all determining an 8×8 array of byte select signals (BS) starting from the specified (x,y) address in a similar manner to the memory select (MS) signals above. Then, especially depending on the size of the window being written (this is not as critical for reading), some of the BS signals will be masked to generate byte enable signals BE0 . . . BE3. For example, for a 7×7 window BS signals BSx7 and BS7y where x=0 . . . 7 and y=0 . . . 7 will be masked to preventing data being written to (or possibly read) the last row and column of an 8×8 window and so overwriting data within the image cache 31. For a 5×5 window, BS signals BSab, where a=5 . . . 7 and where b=0 . . . 7, and BScd, where c=0 . . . 7 and where d=5 . . . 7 will be masked, preventing data being written to (or read) the last 3 rows and columns of an 8×8 window.

The byte select (BS) for all pixels can be calculated within the cache control block 62 with a fixed rotate shift of BS00 (that corresponds to the window origin) as shown below. This means that all the byte select signals can be calculated without the need of logic gates.

Here are the byte select calculation formulas, in Verilog style syntax:

```
BS00 = one_hot ( {y[1:0], x[1:0]} )    BS10 = BS00 >> 4
BS01 = BS00 >> 1                       BS11 = BS00 >> 5
BS02 = BS00 >> 2                       BS12 = BS00 >> 5
BS03 = BS00 >> 3                       BS13 = BS00 >> 7
BS04 = BS00                            BS14 = BS10
BS05 = BS02                            BS15 = BS11
BS06 = BS03                            BS16 = BS12
BS07 = BS04                            BS17 = BS13
BS20 = BS00 >> 8                       BS30 = BS00 >> 12
BS21 = BS00 >> 9                       BS31 = BS00 >> 13
BS22 = BS00 >> 10                      BS32 = BS00 >> 14
BS23 = BS00 >> 11                      BS33 = BS00 >> 15
BS24 = BS20                            BS34 = BS30
BS25 = BS21                            BS35 = BS31
BS26 = BS22                            BS36 = BS32
BS27 = BS23                            BS37 = BS33
BS40 = BS00                            BS50 = BS10
BS41 = BS01                            BS51 = BS11
BS42 = BS02                            BS52 = BS12
BS43 = BS03                            BS53 = BS13
BS44 = BS00                            BS54 = BS10
BS45 = BS01                            BS55 = BS11
BS46 = BS02                            BS56 = BS12
BS47 = BS03                            BS57 = BS13
BS60 = BS20                            BS70 = BS30
BS61 = BS21                            BS71 = BS31
BS62 = BS22                            BS72 = BS32
BS63 = BS23                            BS73 = BS33
BS64 = BS20                            BS74 = BS30
BS65 = BS21                            BS75 = BS31
BS66 = BS22                            BS76 = BS32
BS67 = BS23                            BS77 = BS33
```

In this case, the two least significant bits of the (x,y) address can be used to determine from which of the 16 pixels at a given memory address, a window pixel corresponding to the (x,y) address is to be read, essentially this comprises an offset within a given memory address where the pixel is located. The four (2×2) bits of the (x,y) address can be mapped to this one of 16 pixels using a one-hot function. (One-hot refers to a group of bits among which the legal combinations of values are only those with a single high (1) bit and all the others low (0).) It will then be seen that that the relative addresses of the remaining pixels of the byte select (BS) matrix are shifted in 4 steps of 1 before cycling.

So, looking at BS00 in the example, of FIG. 5, y[1:0]=00h, x[1:0]=00h and so byte 0 of Address 0x01 from SRAM2 is selected (SRAM2 having been determined using the MS matrix and Addr 0x01 having been determined as explained above). If the origin of the selected window were shifted left to address (7, 4), then the one-hot function would indicate {00, 11}=byte 3 to be selected (of Address 0x00 from SRAM3).

All of the remaining elements of the byte select (BS) matrix can be derived from the value of BS00 as they shift in steps of 4×4 in tandem with the shifting origin of a window being addressed.

So combining the MS and BS matrices indicates provisionally the byte enable signals BE0 . . . BE3 for each SRAM0 . . . SRAM3 before masking the provisional signals according to the size (w,h) of the window to determine the final BE0 . . . BE3 values.

Separately, each of the MS and BS matrix values are provided to the input data de-multiplexer 64 and output data multiplexer 66 (possibly according to whether the access is read or write) so that the values from the BE enabled addressed within the SRAMs can be selected and connected either with data being provided at the data input port (din) or being provided to the data output port (dout).

In the above described example, MS and BS matrices are determined for each input/output (I/O) request by the cache control block 62. However, it will be appreciated that the functionality implemented within the cache control block 62 can be shifted to the de-multiplexer 64 or the multiplexer 66 as required or vice versa.

In alternative implementations, the image cache 31 could be further parallelized to enable input maps to be scanned simultaneously so that output map pixels could be generated at a rate of 1 per clock cycle. However, increasing the number of pixels that can be read in parallel would greatly increase the size of the multiplexing/de-multiplexing logic (For this cache the gate count of the multiplexing/de-multiplexing logic is already around 30 KGates) and this may not be desirable.

The memory arrangement illustrated in FIGS. 5 and 6 has been described for implementation within the image cache 31 so that N×M windows of image or map pixels or 1×W windows of vector cells can be made available to the convolution engine 32 in a single clock cycle. It will be appreciated that the weights cache 37 could be implemented in a similar fashion especially so that convolution kernels could be provided to the convolution engine 32 as quickly as possible at the beginning of image or map or vector processing.

In still further variants of the above described embodiments, the image cache 31 can be employed with other forms of image processor than the convolution engine 32. For example, the image cache can be used in any high performance image or 2D map processing application where map elements (pixels) need to be accessed (read or write) in rectangular blocks from random locations in an efficient way—one block per clock cycle at any location in the cache. Such processing might not require a weights cache 37; or alternatively an equivalent to the weights cache might be used to store general purpose kernel values employed by the image processor. In spite of the number of interleaved memories within the image cache remaining the same, the size of block of pixels transferred between the image cache and the image processor in any given clock cycle can be configured for any given application being executed by a CPU, such as the CPU 50, so that for example different sized kernels can be applied to input images to produce different effects for output images.

It will be seen that embodiments of the invention can implemented with main controller 60 requiring only a minimal number of commands including:

RD—Read map from System Memory

WR—Write map to System Memory

CONV—Convolution

END

This allows the engine 30 to be implemented in a very rationalized fashion.

The invention claimed is:

1. A convolutional neural network (CNN) for an image processing system comprising:

an image cache comprising an input port and an output port, said image cache being responsive to a request to read a block of N×M pixels extending from a specified location within an input map to provide said block of N×M pixels at said output port;

a convolution engine being arranged to read at least one block of N×M pixels from said image cache output port, to combine said at least one block of N×M pixels with a corresponding set of weights to provide a product, and to subject said product to an activation function to provide an output pixel value;

said image cache being configured to write output pixel values to a specified write address via said image cache input port;

said image cache comprising a plurality of interleaved memories, each memory storing a block of pixel values at a given memory address, the image cache being arranged to determine for a block of N×M pixels to be read from said image cache: a respective one address within each of said interleaved memories in which said pixels of said block of N×M pixels are stored; a respective memory of said plurality of interleaved memories within which each pixel of said block of N×M pixels is stored; and a respective offset for each pixel of said block of N×M pixels within each memory address, so that said image cache can simultaneously provide said N×M pixels at said output port in a single clock cycle; and a controller arranged to provide a set of weights to said convolution engine before processing at least one input map, to cause said convolution engine to process said at least one input map by specifying locations for successive blocks of N×M pixels and to generate an output map within said image cache by writing said output pixel values to successive locations within said image cache, wherein said weights are stored as 8-bit floating point number with an exponent bias greater that 7D.

2. A CNN according to claim 1 wherein said exponent bias is equal to approximately 12D.

* * * * *

UNITED STATES PATENT AND TRADEMARK OFFICE
CERTIFICATE OF CORRECTION

PATENT NO. : 10,497,089 B2
APPLICATION NO. : 15/234851
DATED : December 3, 2019
INVENTOR(S) : Mihai Constantine Munteanu et al.

Page 1 of 1

It is certified that error appears in the above-identified patent and that said Letters Patent is hereby corrected as shown below:

In the Claims

Column 14, Lines 18-19, in Claim 1, "greater that" should read --greater than--.

Signed and Sealed this
Twenty-fifth Day of February, 2020

Andrei Iancu
*Director of the United States Patent and Trademark Office*